United States Patent [19]

Bernard

[11] Patent Number: 5,386,615

[45] Date of Patent: Feb. 7, 1995

[54] BUTTONHEAD TIE WITH SPLIT CENTERING PILOT

[75] Inventor: William A. Bernard, Darien, Ill.

[73] Assignee: Panduit Corp., Tinley Park, Ill.

[21] Appl. No.: 132,721

[22] Filed: Oct. 6, 1993

[51] Int. Cl.⁶ .............................................. B65D 63/00
[52] U.S. Cl. ................. 24/16 PB; 24/17 AP; 248/74.3
[58] Field of Search ........... 24/16 PB, 17 AP, 30.5 P, 24/453; 248/74.3

[56] References Cited

U.S. PATENT DOCUMENTS

| | | | |
|---|---|---|---|
| 3,258,819 | 7/1966 | Weckesser | 24/16 PB |
| 3,744,096 | 7/1973 | Kok . | |
| 3,819,139 | 6/1974 | Jemison . | |
| 3,900,922 | 8/1975 | McCormick | 24/16 PB |
| 4,269,379 | 5/1981 | McCormick . | |
| 4,272,870 | 6/1981 | McCormick . | |
| 4,458,385 | 7/1984 | Espinoza . | |
| 4,557,023 | 12/1985 | Six et al. . | |
| 4,680,834 | 7/1987 | Andre et al. . | |
| 5,121,524 | 6/1992 | Mortensen | 24/16 PB |

OTHER PUBLICATIONS

Panduit Catalog Page No. 6, one page, no date is given.

*Primary Examiner*—Victor N. Sakran
*Attorney, Agent, or Firm*—Charles R. Wentzel; Mark D. Hilliard; Robert A. McCann

[57] ABSTRACT

A plastic fastener for securing a bundle of wires to an apertured mounting surface including a buttonhead member, an elongate flexible strap having a plurality of teeth, the strap having a locking head that engages with a buttonhead member. The buttonhead member includes centering pilot sections which protect the tightened strap from sharp edges of the mounting surface.

21 Claims, 3 Drawing Sheets

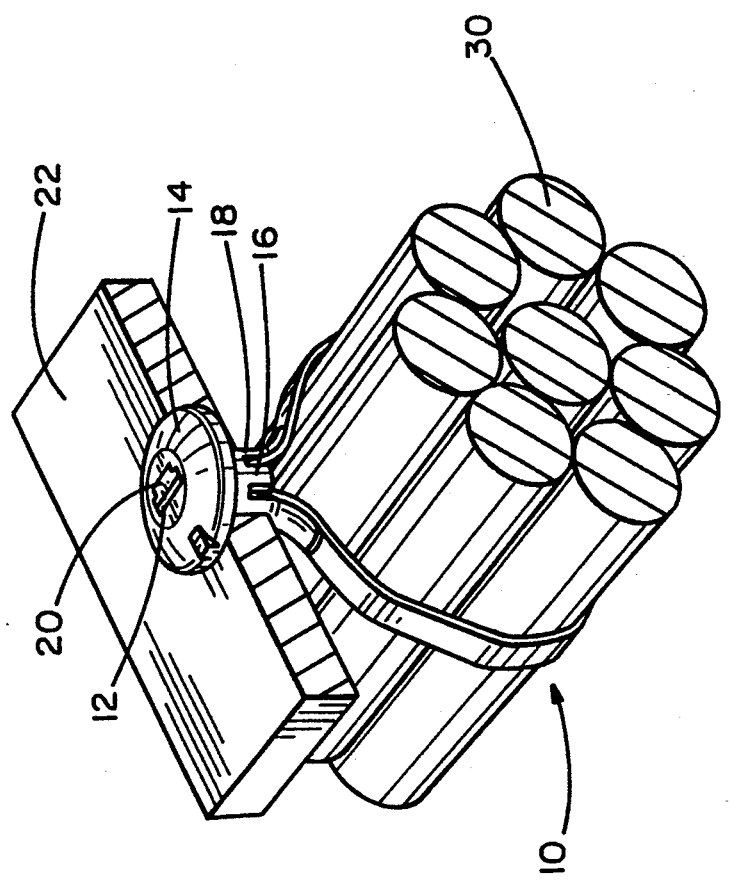
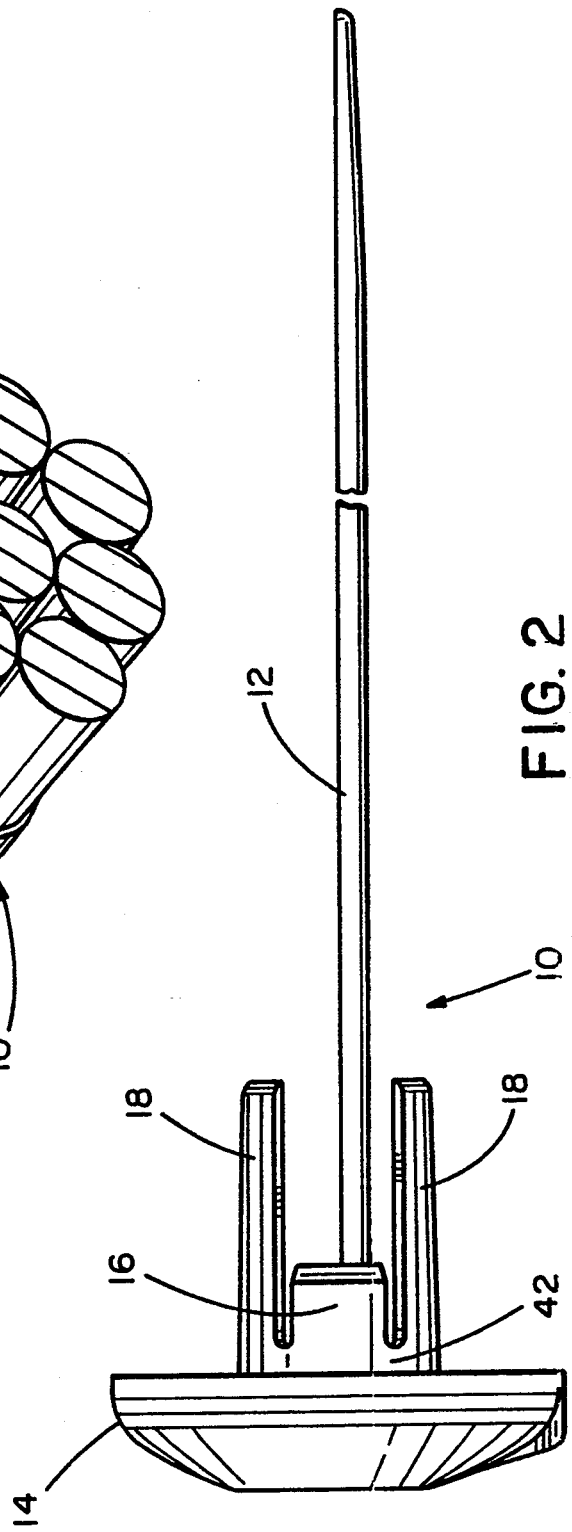

BUTTONHEAD TIE WITH SPLIT CENTERING PILOT

TECHNICAL FIELD

The present invention relates to fasteners for securing a bundle of wires or the like to a mounting surface, and more particularly to fasteners of the type where a strap is inserted through an aperture in the mounting surface, looped around the bundle, and inserted back through the aperture of the mounting surface and secured thereto.

BACKGROUND OF THE INVENTION

In the electronics and other related industries there are many applications that arise for securing a bundle of wires to an apertured mounting surface. The applications for fasteners of this type involve the user having access to both sides of the mounting surface. Holes in the mounting surface for securing the bundle can either be pre-cut or cut as needed. There are a variety of strap fasteners having aperture mounting features previously known in the art.

Many of these fasteners have a strap portion that is inserted through a hole in the mounting surface and wrapped around a bundle of wires, and then inserted back through the hole and secured to the mounting board. See U.S. Pat. Nos. 4,269,379 and 4,272,870.

A significant problem that exists with strap fasteners that are inserted through a hole in the mounting surface and secured thereto, is that the tightened strap is often forced against sharp edges of the mounting surface. Many times the sharp edges are created by the cutting of the aperture in the mounting surface. This can be particularly problematic when the mounting surface is metal or other hard surface where sharp edges are present around the aperture. The sharp edges cause cuts to form in the strap resulting in strap failures.

SUMMARY OF THE INVENTION

It is therefore an object of the present invention to provide an improved strap fastener for mounting a bundle of wires to a mounting surface.

It is another object of the present invention to provide a buttonhead tie for mounting a bundle of wires to an apertured mounting surface which improves the centering of the tie within the aperture.

It is still further an object of the present invention to provide a strap fastener for mounting a bundle of wires to an apertured mounting surface that protects the strap from contacting sharp edges of the mounting surface.

In general, a buttonhead tie with split centering pilot includes a buttonhead member having a top side and an underside and including an aperture formed therethrough, an elongate strap having a free end and a second end extending from the underside of the buttonhead member and having a plurality of teeth formed on an inner planar side and including a locking head formed at the second end, strap locking means formed on the locking head for securing the free end of the strap, centering means disposed on the underside of the buttonhead member, and protecting means extending from the centering means for protecting an outer planar side of the strap from contacting sharp edges of the mounting surface.

BRIEF DESCRIPTION OF THE DRAWINGS

FIG. 1 is a perspective view of a buttonhead tie embodying the concept of the present invention shown fastening a bundle of cables to a mounting surface.

FIG. 2 is a side planar view of the button tie member of FIG. 1.

DESCRIPTION OF THE PREFERRED EMBODIMENT

Figure 3:
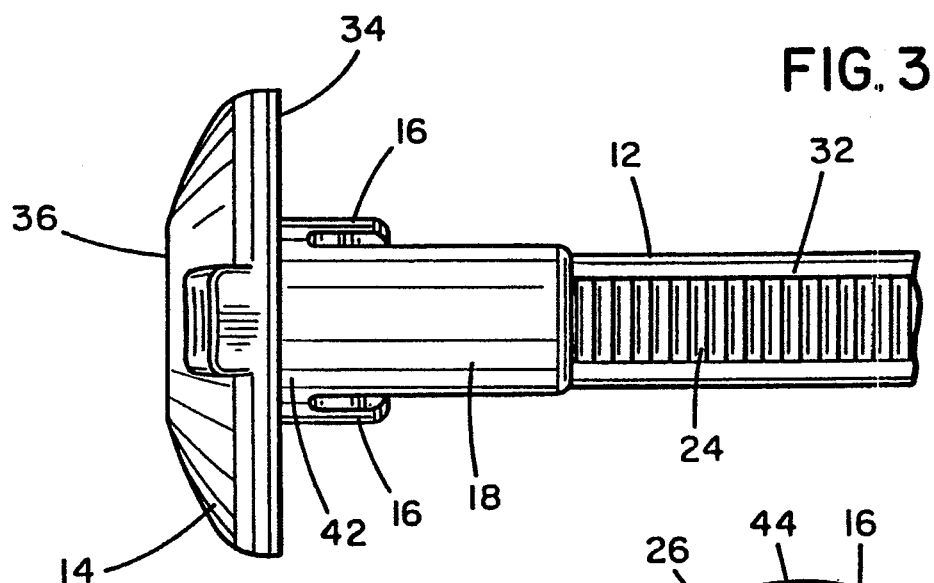
FIG. 3 is a front sectional view of the buttonhead tie of FIG. 2.
Figure 4:
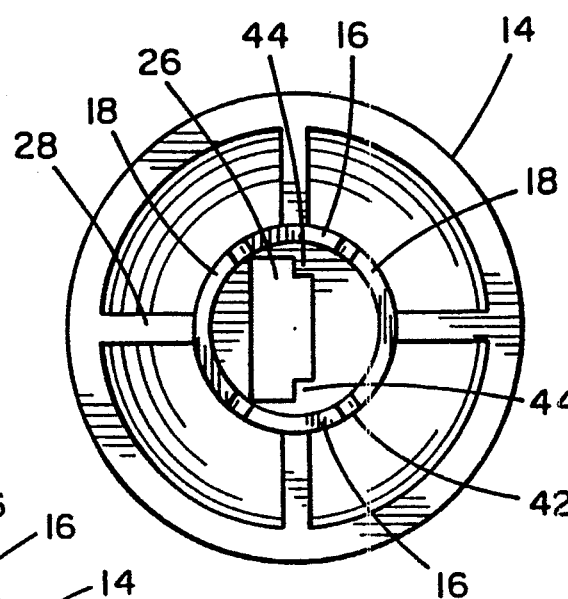
FIG. 4 is a bottom view of the buttonhead member of the present invention.

A buttonhead tie embodying the concept of the present invention is designated generally by the reference number 10 in the accompanying drawings. Buttonhead tie 10 is formed from a thermoplastic material, and as can be seen in FIG. 2 includes an elongated strap 12 and a buttonhead member 14. Strap 12 has a plurality of teeth 24 formed between a pair of marginal rails 32 along an inner planar side 38 and a locking head 20 formed at one end. Locking head 20 is generally wedge-shaped so as to be engageable with an aperture 26 of buttonhead member 14 but large enough to prevent its being pulled fully through aperture 26 of buttonhead member 14. Locking head 20 has a plurality of teeth 46 formed on an inner side that act as strap locking means. The narrowing of aperture 26 allows for strap 12 to be passed through until stops 44 prevent locking head 20 from passing through aperture 26. Locking head 20 seats itself on stops 44 within aperture 26 as strap 12 is pulled through. Buttonhead member 14 has a top side 36 and an underside 34 and is generally dome-shaped. As best seen in FIGS. 3 and 4, buttonhead member 14 also includes a centering ring 42 extending out from the underside 34 of buttonhead member 14 and surrounded by four supporting ridges 28. There are two shorter pilot sections 16 and two longer pilot sections 18 that extend from centering ring 42. The two pairs of pilot sections 16, 18 are flexible and opposing. When strap 12 is engaged with buttonhead member 14, the short pilot sections 16 are situated on the sides of cable tie strap 12 and the longer pilot sections 18 are parallel to the inner planar side of the strap 12. These pilot sections 16, 18 in conjunction with centering ring 42 help center the buttonhead tie within a hole of a mounting surface 22.

Figure 5:
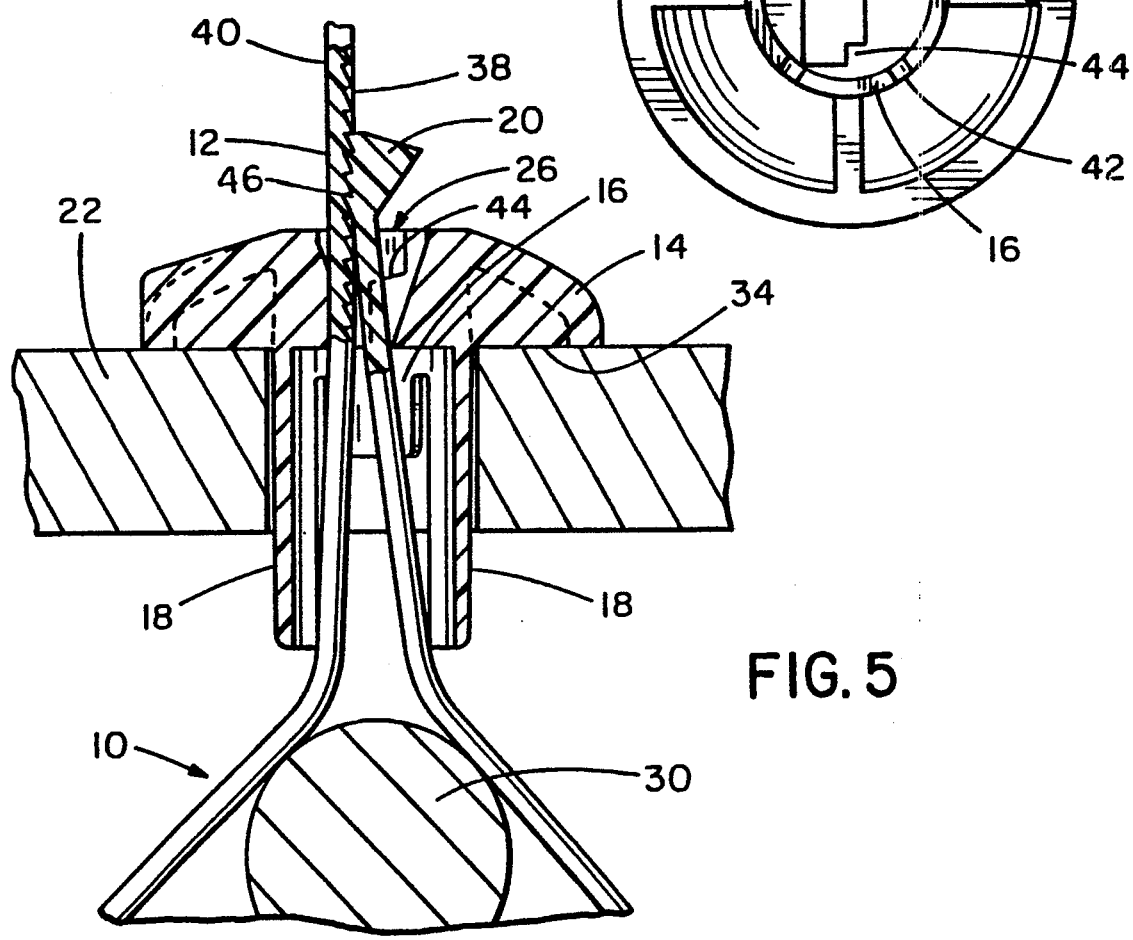
FIG. 5 is a sectional view of the buttonhead tie of FIG. 1 shown prior to tightening of the strap.
Figure 6:
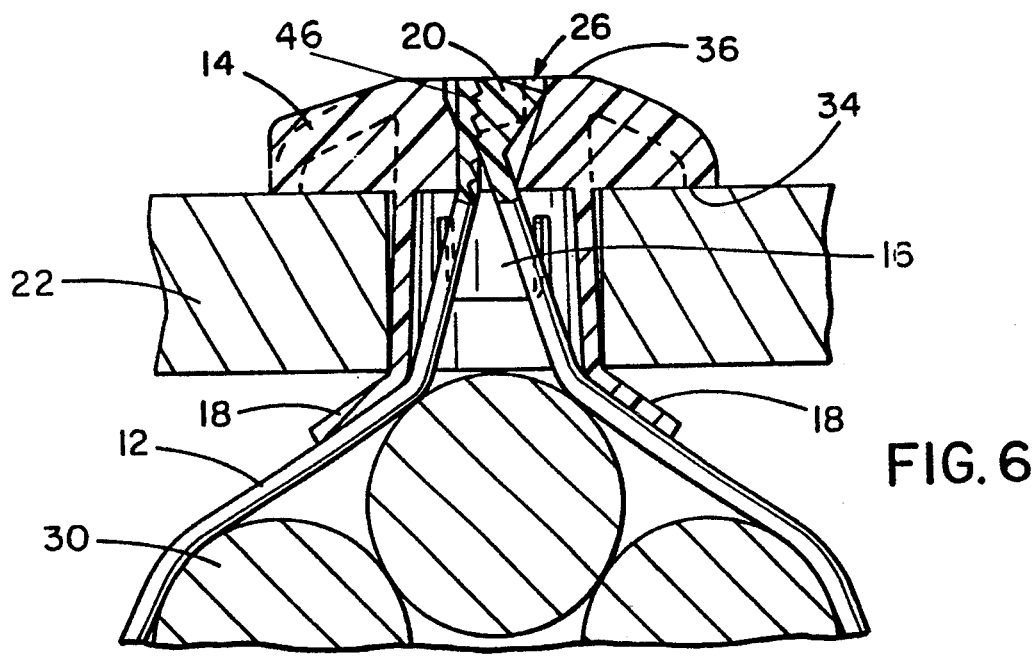
FIG. 6 is a sectional view of the buttonhead of FIG. 1 shown with the strap tightened and the excess strap cut away.

In operation strap 12 and buttonhead member 14 are engaged, with locking head 20 seated within aperture 26 of buttonhead member 14 and strap 12 extending out from the underside 34 of buttonhead member 14. The leading end of strap 12 is inserted into a hole in mounting surface 22 and pulled through until the underside 34 of buttonhead member 14 abuts mounting surface 22. In a securing position, centering ring 42 and pilot extensions 16, 18 center the buttonhead tie 10 in the hole of mounting surface 22. The strap 12 is then looped around a bundle of wires 30 and inserted back through aperture 26 in buttonhead member 14 to be tightened and secured. As can be seen in FIG. 5, as the leading end of the strap 12 is initially inserted back through aperture 26 of buttonhead member 14, the locking head 20 of strap 12 gets unseated from stops 44 within aperture 20 of buttonhead member 14. The wedge-shaped locking head 20 seated on stops 44 within the narrowing aperture 26 does not leave enough space for strap 12 to be inserted back through without unseating locking head 20. As shown in FIG. 6, when strap 12 is further tightened around bundle 30, locking head 20 is pulled back down and seated against stops 44 within aperture 26 of buttonhead member 14 and teeth 46 of locking head 20 engage teeth 24 of strap 12 to lock and secure the bundle of wires 30. After fully tightening and locking strap 12 any excess strap may be cut off. As can be best seen in FIG. 6, the longer opposing pilot sections 18 bend around the corners of mounting surface 22 and protects the outer planar surface 40 of strap 12 from the sharp edges of mounting surface 22.

While buttonhead tie 10 has been shown as a two-piece fastener in the figures, it is noted that the same advantages could be achieved by a fastener in which the strap head and locking means are integrally molded with the buttonhead member.

Figure 7:
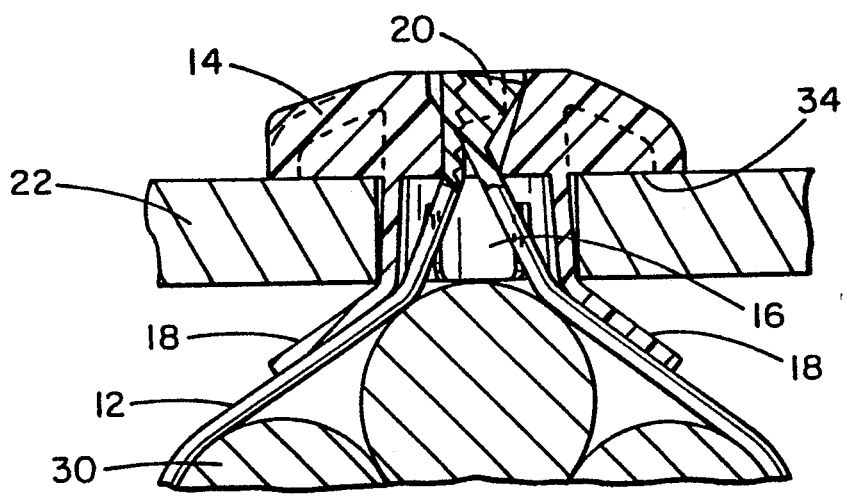
FIG. 7 is a sectional view of the buttonhead tie of the present invention shown securing a bundle to a thinner mounting panel.

FIG. 7 shows the buttonhead tie of the present invention securing a bundle of wires 30 to a relatively thin mounting surface. As can be seen in FIG. 7, the longer pilot sections merely bend around the mounting surface at a different point to protect strap 12 from the sharp edges of mounting surface 22.

Figure 8:
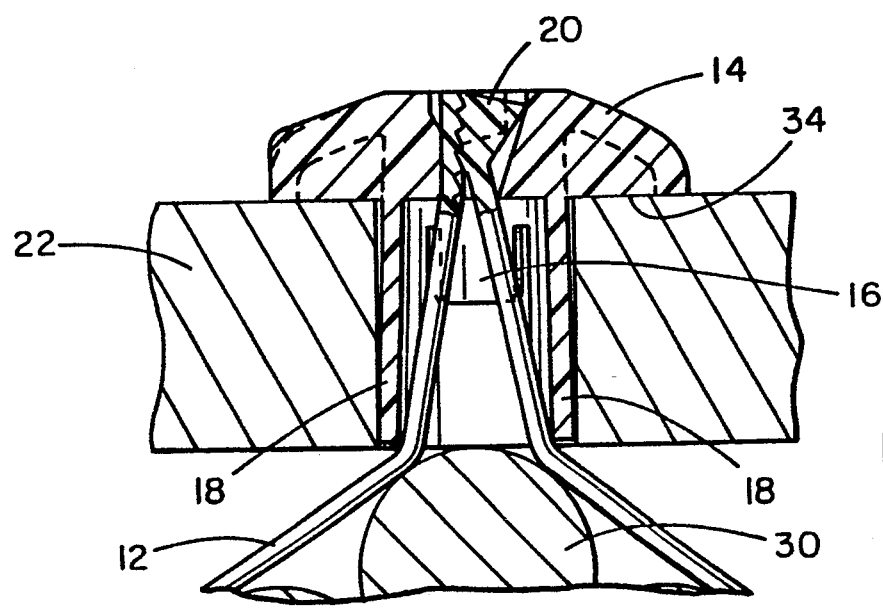
FIG. 8 is a buttonhead tie of the present invention shown securing a bundle to a thicker mounting panel.

FIG. 8 shows the buttonhead tie of the present invention securing a bundle of wires to a relatively thick mounting surface. As can be seen in FIG. 8, the longer pilot sections do not bend but still protect strap 12 from abutting the sharp edge of mounting surface 22.

Since there are numerous possible thicknesses for the mounting surface 22, it is noted that opposing pilot sections 18 need merely be of a sufficient length to prevent strap 12 from contacting mounting surface 22, whatever its depth may be.

While the particular embodiment of the present invention has been shown and described, it will be obvious to those skilled in the art that changes and modifications may be made without departing from the invention in its broader aspects. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A fastener for securing a bundle of wires to an apertured mounting surface, comprising:
    a buttonhead member having a top side and an underside and including a strap accepting aperture formed therethrough;
    an elongate strap having a free end and a second end extending from the underside of the buttonhead member and having a plurality of teeth formed on an inner planar side and including a locking head formed at the second end;
    strap locking means formed on the locking head for securing the free end of the strap
    centering means disposed on the underside of the buttonhead member;
    protecting means extending from the centering means for protecting the strap from contacting sharp edges of the mounting surface.

2. A fastener in accordance with claim 1, wherein the centering means is an annular centering ring extending from the underside of the buttonhead member.

3. A fastener in accordance with claim 2, wherein the protecting means includes a plurality of pilot sections extending from the centering ring.

4. A fastener in accordance with claim 3, wherein the pilot sections are flexible.

5. A fastener in accordance with claim 3, wherein there are four pilot sections.

6. A fastener in accordance with claim 3, wherein there are two pairs of opposing pilot sections.

7. A fastener in accordance with claim 6, wherein a first pair of the opposing pilot sections are situated so as to be parallel to the planar sides of the strap.

8. A fastener in accordance with claim 7, wherein the first pair of opposing pilot sections have a sufficient length to prevent the strap from contacting the mounting surface.

9. A fastener in accordance with claim 1, wherein the strap locking means includes teeth formed on the locking head positioned so as to engage the teeth of the strap as the strap is inserted back through the strap accepting aperture and tightened after being looped around a bundle of wires.

10. A two-piece fastener for securing a bundle of wires to an apertured mounting surface, comprising:
    a buttonhead member having a top side and an underside and including a strap accepting aperture formed therethrough;
    an elongate strap having a free end and a second end engageable with the buttonhead member having a plurality of teeth formed on an inner planar side and including a locking head formed at the second end;
    strap locking means formed on the locking head for securing the free end of the strap
    centering means disposed on the underside of the buttonhead member;
    protecting means extending from the centering means for protecting the strap from contacting sharp edges of the mounting surface.

11. A two-piece fastener in accordance with claim 10, wherein the centering means is an annular centering ring extending from the underside of the buttonhead member.

12. A two-piece fastener in accordance with claim 11, wherein the protecting means includes a plurality of pilot sections extending from the centering ring.

13. A two-piece fastener in accordance with claim 12, wherein the pilot sections are flexible.

14. A two-piece fastener in accordance with claim 12, wherein there are four pilot sections.

15. A two-piece fastener in accordance with claim 12, wherein there are two pairs of opposing pilot sections.

16. A two-piece fastener in accordance with claim 15, wherein a first pair of the opposing pilot sections are situated so as to be parallel to the planar sides of the strap.

17. A two-piece fastener in accordance with claim 16, wherein the first pair of opposing pilot sections have a sufficient length to prevent the strap from contacting the mounting surface.

18. A two-piece fastener in accordance with claim 10, wherein the strap locking means includes teeth formed on the locking head positioned so as to engage the teeth of the strap as the strap is inserted back through the strap accepting aperture and tightened after being looped around a bundle of wires.

19. A two-piece fastener in accordance with claim 10, wherein the locking head is wedge shaped.

20. A two-piece fastener in accordance with claim 10, wherein the aperture is centrally disposed on the buttonhead member.

21. A two-piece fastener in accordance with claim 10, wherein the aperture of the buttonhead member includes stops for the locking head of the strap to seat against.

* * * * *